(12) United States Patent
Christensen et al.

(10) Patent No.: US 12,215,674 B2
(45) Date of Patent: Feb. 4, 2025

(54) WIND TURBINE AND METHOD FOR OPERATING THE WIND TURBINE

(71) Applicant: Siemens Gamesa Renewable Energy A/S, Brande (DK)

(72) Inventors: Jens Brix Christensen, Vejle (DK); Aljosa Sarcevic, Brande (DK); Michael Bilet Skovgaard Steffensen, Hasselager (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/095,823

(22) Filed: Nov. 12, 2020

(65) Prior Publication Data
US 2021/0156362 A1  May 27, 2021

(30) Foreign Application Priority Data
Nov. 27, 2019  (EP) .................... 19211914

(51) Int. Cl.
*F03D 80/60* (2016.01)
*F03D 9/25* (2016.01)
*F03D 80/70* (2016.01)

(52) U.S. Cl.
CPC ............. *F03D 80/60* (2016.05); *F03D 9/25* (2016.05); *F03D 80/70* (2016.05); *F05B 2260/20* (2013.01); *F05B 2270/303* (2013.01)

(58) Field of Classification Search
CPC . F03D 80/60; F03D 80/70; F03D 9/25; F03D 9/27; F05B 2260/20; F05B 2270/303; H02K 7/83; H02K 7/1838
(Continued)

(56) References Cited

U.S. PATENT DOCUMENTS 8,632,303 B2 * 1/2014 Akashi .................... F03D 80/60
  415/176
2008/0307817 A1  12/2008 Roesner et al.
(Continued)

FOREIGN PATENT DOCUMENTS

CN  101330819 A    12/2008
CN  101705921 A  *  5/2010
(Continued)

OTHER PUBLICATIONS

Fan, English Translation of CN-101705921-A, May 12, 2010 (Year: 2010).*
(Continued)

*Primary Examiner* — Kenneth J Hansen
*Assistant Examiner* — Kelsey L Stanek
(74) *Attorney, Agent, or Firm* — Schmeiser, Olsen & Watts LLP

(57) ABSTRACT

Provided is a wind turbine including multiple components generating heat during operation of the wind turbine and a liquid cooling system, wherein the multiple components are thermally coupled by a liquid coolant cycle of the liquid coolant system to an ambient heat exchanger of the liquid coolant system, the ambient heat exchanger being arranged to exchange heat between a liquid coolant contained in the liquid coolant cycle and ambient air, whereby the liquid coolant system includes a heat pump having a cooling operation mode, wherein the heat pump is arranged in the coolant liquid cycle such that the liquid coolant of the liquid coolant cycle is cooled, when the heat pump is operated in the cooling operation mode. Also provided is a method for operating the wind turbine.

14 Claims, 3 Drawing Sheets

(58) Field of Classification Search
USPC .......................................................... 416/95
See application file for complete search history.

(56) References Cited

U.S. PATENT DOCUMENTS

| | | |
|---|---|---|
| 2010/0102653 A1 | 4/2010 | Gundtoft et al. |
| 2011/0095539 A1 | 4/2011 | Tietze et al. |
| 2011/0140418 A1 | 6/2011 | Matsuo et al. |
| 2014/0137582 A1 | 5/2014 | Louvar et al. |
| 2015/0210141 A1* | 7/2015 | Ragazzi ................... B60H 1/22 |
| | | 62/93 |
| 2015/0233265 A1 | 8/2015 | Rohden |
| 2016/0033175 A1* | 2/2016 | Ragazzi ................. F25B 41/20 |
| | | 62/324.1 |
| 2017/0211829 A1* | 7/2017 | Slack ...................... F24D 19/10 |

FOREIGN PATENT DOCUMENTS

| | | |
|---|---|---|
| CN | 101728896 A | 6/2010 |
| CN | 202108673 U | 1/2012 |
| CN | 202468176 U | 10/2012 |
| CN | 102822514 A | 12/2012 |
| CN | 103185410 A | 7/2013 |
| CN | 104956075 A | 9/2015 |
| CN | 109578228 A | 4/2019 |
| EP | 2007184 A2 * 12/2008 ............. F28D 15/00 |
| EP | 2578879 A1 | 4/2013 |
| EP | 3805559 A1 | 4/2021 |

OTHER PUBLICATIONS

European Search Report issued May 12, 2020 for Application No. 19211914.7.

* cited by examiner

WIND TURBINE AND METHOD FOR OPERATING THE WIND TURBINE

CROSS-REFERENCE TO RELATED APPLICATIONS

This application claims priority to European Application No. 19211914.7, having a filing date of Nov. 27, 2019, the entire contents of which are hereby incorporated by reference.

FIELD OF TECHNOLOGY

The following relates to a wind turbine comprising multiple components generating heat during operation of the wind turbine and a liquid cooling system. Further, the following relates to a method for operating the wind turbine.

BACKGROUND

The components generating heat during operation of the wind turbine are limiting the capabilities of the wind turbine and thus need to be cooled. A known solution is that the multiple components are thermally coupled by a liquid coolant cycle to an ambient heat exchanger of the liquid coolant system. The ambient heat exchanger is arranged to exchange heat between a liquid coolant contained in the liquid coolant cycle and ambient air. This solution allows for cooling of the components at low energy consumption. However, the cooling capacities of the liquid coolant are limited by virtue of the ambient temperature of the ambient air. Thus, it is necessary to limit the achievable performance of the wind turbine at certain operations or configurations to prevent the components from overheating, which may result in damage to the components and failure of the wind turbine.

SUMMARY

An aspect relates to an improved wind turbine and an improved method of operating the wind turbine, wherein the wind turbine may be operated at improved performance with as little as possible dependency of the heat generated by the components during operation of the wind turbine and at a low cost.

Thereby, the features and details described in connection with the wind turbine of embodiments of the invention apply in connection with the method of embodiments of the invention, so that regarding the disclosure of the individual aspects of embodiments of the invention it is or can be referred to one another.

According to a first aspect of embodiments of the invention, the object is solved by a wind turbine comprising multiple components generating heat during operation of the wind turbine and a liquid cooling system, wherein the multiple components are thermally coupled by a liquid coolant cycle of the liquid coolant system to an ambient heat exchanger of the liquid coolant system, the ambient heat exchanger being arranged to exchange heat between a liquid coolant contained in the liquid coolant cycle and ambient air, whereby the liquid coolant system comprises a heat pump having a cooling operation mode, wherein the heat pump is arranged in the coolant liquid cycle such that the liquid coolant of the liquid coolant cycle is cooled, when the heat pump is operated in the cooling operation mode.

The heat pump integrated into the liquid coolant cycle of the liquid coolant system having the ambient heat exchanger it is possible to cool the liquid coolant below the ambient temperature of the ambient air to increase performance of the wind turbine, in particular its components such as a generator of the wind turbine up to their full capabilities. Further, the cooling of the liquid coolant and thereby the components may be accelerated compared to providing the cooling by the ambient heat exchanger only. Also, the cooling of the components is not dependent on the ambient temperature of the ambient air. Due to the redundant structure of having the ambient heat exchanger and heat pump being operable in a cooling operation mode for cooling the liquid coolant, in case of failure of either of these, the other one of the two may take over the cooling operation or supply most of the cooling.

The components generating heat during operation of the wind turbine may be at least two, at least three or all of the following: a generator, a converter, a transformer, a bearing unit and/or a hydraulic unit. These components are particularly crucial with respect to the performance of the wind turbine when generating heat and thus should actively be cooled.

The liquid coolant in the liquid coolant cycle may comprise or be water, glycol or a mixture of water and glycol, for example.

The liquid coolant cycle may be formed by pipes, hoses or similar connected to the ambient heat exchanger, the heat pump and the multiple components generating heat during operation of the wind turbine.

The heat pump may be connected in series to the ambient heat exchanger by the liquid coolant cycle. The cooling operation mode of the heat pump may also be referred to as a reverse mode of the heat pump. The heat pump may be arranged to be supplied with electrical energy from the wind turbine or another source for operation of the heat pump.

The ambient heat exchanger may be arranged in a cooling tower, for example. The cooling tower may be mounted on an outside of a nacelle of the wind turbine, in particular on a roof of the nacelle. The ambient air enters the ambient heat exchanger at ambient temperature, the liquid coolant exchanges heat with the ambient air and as a result the liquid coolant leaves the ambient heat exchanger having a lower temperature compared to when it entered the ambient heat exchanger and the ambient air leaves the ambient heat exchanger at a higher temperature compared to when it entered the ambient heat exchanger.

Components of the multiple components thermally coupled by the liquid coolant cycle to the ambient heat exchanger may be coupled directly by the liquid coolant or indirectly by a heat exchanger, for example. For example, the indirectly coupled components may have a coolant different from the liquid coolant and a different cycle, such as an air cycle or an oil cycle. For example, in a bearing unit as a component generating heat during operation of the wind turbine, the lubricating oil of the bearing unit may be cooled by a heat exchanger thermally coupled with the liquid coolant cycle. In particular, at least one of the multiple components may be thermally coupled by the liquid coolant cycle to the ambient heat exchanger directly by the liquid coolant and at least one of the multiple components may be thermally coupled by the liquid coolant cycle to the ambient heat exchanger indirectly by a heat exchanger and in particular to an air cycle or an oil cycle.

The heat pump is connected in parallel to the ambient heat exchanger. This means that either the heat pump or the ambient heat exchanger may be operated to provide the cooling. Thereby, the reliability of the liquid coolant system is maintained upon integration of the heat pump into the liquid coolant system as both, the ambient heat exchanger and the heat pump, may be configured to be operated separately or together.

Further, the heat pump has a refrigerant cycle separate from the liquid coolant cycle. Thereby, the coolant cycle of the ambient heat exchanger and the heat pump are further effectively decoupled in their operations such that they may be operated individually in case either of both fails.

It is preferred, that the heat pump is arranged in between the multiple components generating heat during operation of the wind turbine and the ambient heat exchanger. Thereby, the liquid coolant may be cooled by the heat pump, when the heat pump is operated in the cooling operation mode, before any of the multiple components is cooled by the liquid coolant. Thus, all of the multiple components being cooled by the liquid coolant may be cooled by the liquid coolant cooled by the heat pump. This enables for cooling all of the multiple components below ambient temperature.

Additionally, or alternatively, it is preferred, that the heat pump or a further heat pump is arranged in between two of the multiple components generating heat during operation of the wind turbine. Thereby, it can be excluded that one or some of the multiple components are cooled by the liquid coolant cooled by the heat pump. Instead, the heat pump is installed within the liquid coolant cycle such that its cooling capabilities are provided for one or more specific components of the multiple components. Thereby, the energy consumption of the heat pump may be reduced or specified to one or more components compared to a solution where all the components are cooled by the liquid coolant cooled by the heat pump.

In particular, it is preferred, that one of the two of the multiple components, in between which the heat pump is arranged, is a generator of the wind turbine. The generator typically generates a lot of heat during operation of the wind turbine and is thereby limited in its capability. Therefore, it is preferred to arrange the heat pump within the liquid coolant cycle such that is specifically cooling the generator, i.e. not cooling the at least one component being arranged before the heat pump and thus not being cooled by it but which is only being cooled by the ambient heat exchanger.

It is further preferred, that one of the multiple components generating heat during operation of the wind turbine is a generator. The generator typically generates a lot of heat during operation of the wind turbine and is thereby limited in its capability. The generator may be arranged in the nacelle of the wind turbine.

Also, it is preferred, that the generator comprises an internal cooling unit, wherein the internal cooling unit is arranged to cool the air flowing trough or inside of the generator or its housing by the liquid coolant of the liquid coolant cycle. The internal cooling unit may be an internal heat exchanger exchanging heat between the air flowing through or inside of the generator or its housing and the liquid coolant flowing through it. The internal cooling unit may be arranged such that the air flows in between stator windings of the generator. For example, one or more fans may be arranged for optimizing the air flow through or inside of the generator or its housing, in particular the air flow in between the stator windings.

Moreover, it is preferred, that one of the multiple components generating heat during operation of the wind turbine is a converter. The converter may be arranged in the nacelle or the tower of the wind turbine, for example.

Further, it is preferred, that the generator and the converter are connected in parallel with each other by the liquid coolant cycle. Thereby, it may be controlled, how much or if the liquid coolant is supplied to either of the generator or the converter to control cooling of these components. For this purpose, a valve, in particular a three-way valve, may be arranged in the liquid coolant cycle in between the generator and the converter.

Also, it is preferred, that at least one of the multiple components is a bearing unit, a transformer and/or a hydraulic unit. The bearing unit may support a rotating shaft connected to a hub having wind turbine blades attached thereto. The rotating shaft may further be directly or via a gearbox attached to the generator. The transformer may be arranged within the nacelle or the tower, for example.

It is further preferred, that the heat pump comprises a condenser, a compressor, an evaporator and an expansion valve. The expansion valve may also be referred to as a throttle valve or metering device. The vapor-compression provided by the heat pump may use a circulating liquid refrigerant as the medium which absorbs and removes heat from the space to be cooled and subsequently rejects that heat elsewhere. The heat pump may be provided with a liquid refrigerant cycle being different from the liquid coolant cycle. In such a heat pump, circulating liquid refrigerant enters the compressor in the thermodynamic state known as a saturated vapor and is compressed to a higher pressure, resulting in a higher temperature as well. The hot, compressed vapor is then in the thermodynamic state known as a superheated vapor and it is at a temperature and pressure at which it can be condensed with either cooling water or cooling air flowing across a coil or tubes in the evaporator. This is where the circulating liquid refrigerant rejects heat from the system and the rejected heat is carried away by either the water or the air (whichever may be the case). The condensed liquid refrigerant, in the thermodynamic state known as a saturated liquid, is next routed through an expansion valve where it undergoes an abrupt reduction in pressure. That pressure reduction results in an adiabatic flash evaporation of a part of the liquid refrigerant. The autorefrigeration effect of the adiabatic flash evaporation lowers the temperature of the liquid and vapor refrigerant mixture to where it is colder than the temperature of the enclosed space to be refrigerated, whereby the enclosed space is formed by or comprises the liquid coolant of the liquid coolant cycle. The cold mixture is then routed through the coil or tubes in the evaporator. A fan may circulate the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature. The evaporator is where the circulating refrigerant absorbs and removes heat which is subsequently rejected in the condenser and transferred elsewhere by the water or air used in the condenser. To complete the refrigeration cycle, the refrigerant vapor from the evaporator is again a saturated vapor and is routed back into the compressor. The temperatures may be controlled by using a pressure volume curve which fits predetermined design parameters.

Additionally, it is preferred, that the liquid coolant system comprises a control unit, wherein the control unit is arranged to operate the heat pump in the cooling operation mode such that the temperature of the liquid coolant cooled by the heat pump is lower than the ambient temperature of the ambient air. The control unit may be integrated within the heat pump or a heat pump housing of the heat pump, for example.

It is particularly preferred, that the control unit is arranged to operate the heat pump in the cooling operation mode upon receiving a request for operating or upon operating the wind turbine at a load requiring cooling of the liquid coolant below ambient temperature of the ambient air. The request for operating may be sent out from the control unit or another control unit of the wind turbine upon detection of exceeding a predefined temperature threshold of at least one of the multiple components, for example. Thereby, the capability of the heat pump to provide the requested cooling may be checked before operating the wind turbine at a load being potentially dangerous to at least one of the multiple components and possibly resulting in a failure of that component. Alternatively, when the wind turbine is operated at the higher load without a request, the detected exceedance of the temperature thresholds may initiate the cooling by the heat pump.

According to a second aspect of embodiments of the invention, the problem is solved by a method for operating a wind turbine according to any of the previous claims, wherein the method comprises the steps of:

(a) cooling the liquid coolant by the ambient heat exchanger, (b) requesting operation of or operating the wind turbine at a load requiring cooling of the liquid coolant below ambient temperature of the ambient air, and (c) operating the heat pump in the cooling operation mode such that the temperature of the liquid coolant cooled by the heat pump is lower than the ambient temperature of the ambient air.

Thereby, the method according to the second aspect of embodiments of the invention has the advantages of the wind turbine according to the first aspect of embodiments of the invention as described above.

BRIEF DESCRIPTION

Some of the embodiments will be described in detail, with references to the following Figures, wherein like designations denote like members, wherein.

DETAILED DESCRIPTION

Figure 1:
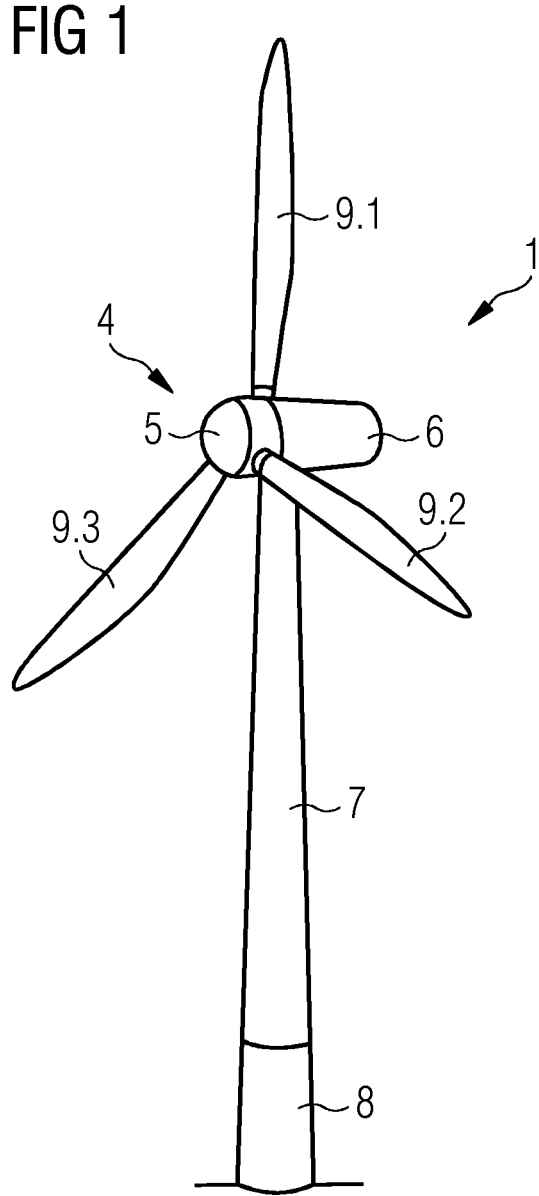
FIG. 1 shows a side perspective view on a wind turbine according to an exemplary embodiment of the invention.
Figure 2:
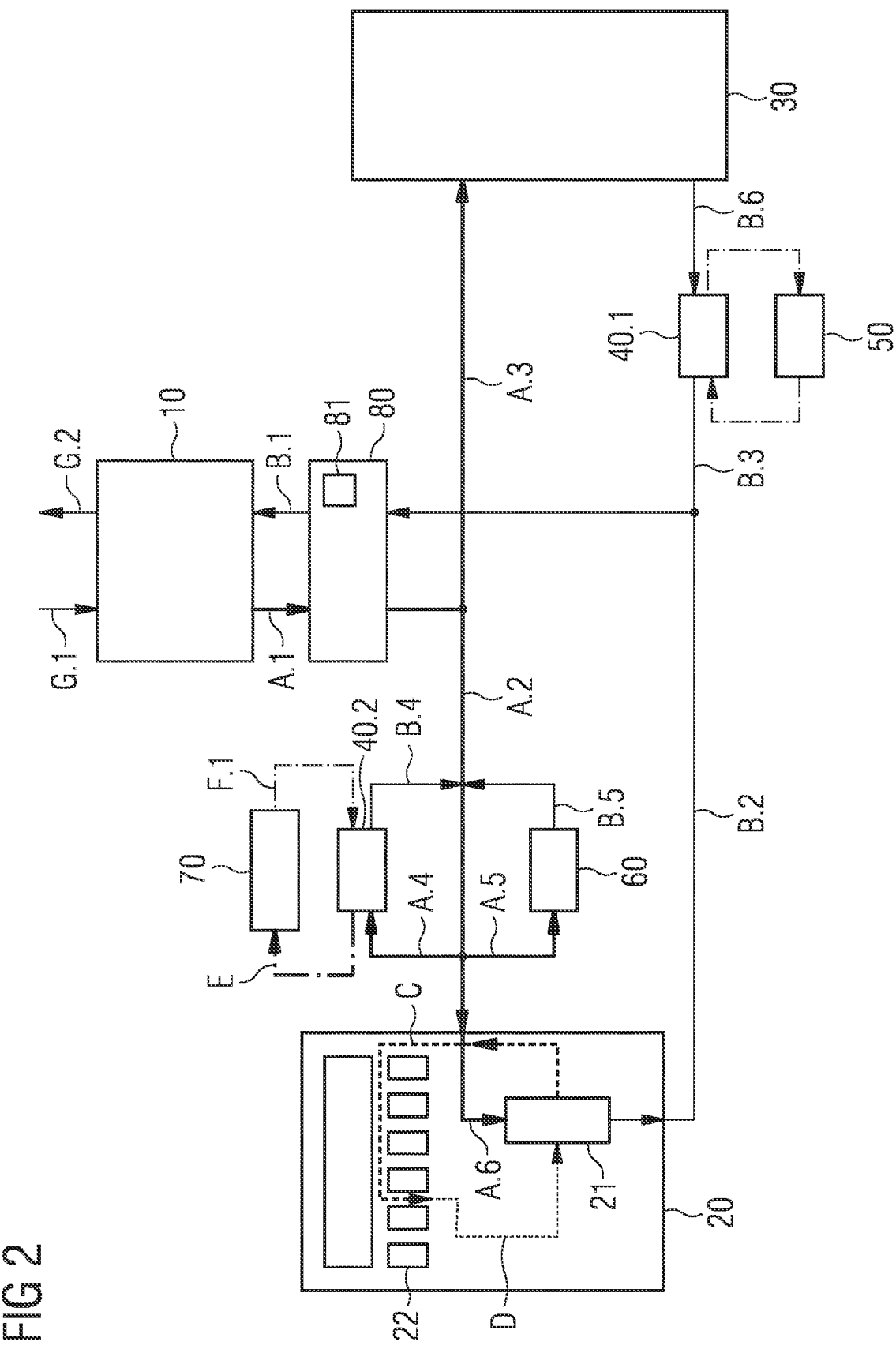
FIG. 2 shows a diagram showing a liquid coolant system with multiple components of the wind turbine of FIG. 1 according to a first embodiment of the invention.
Figure 3:
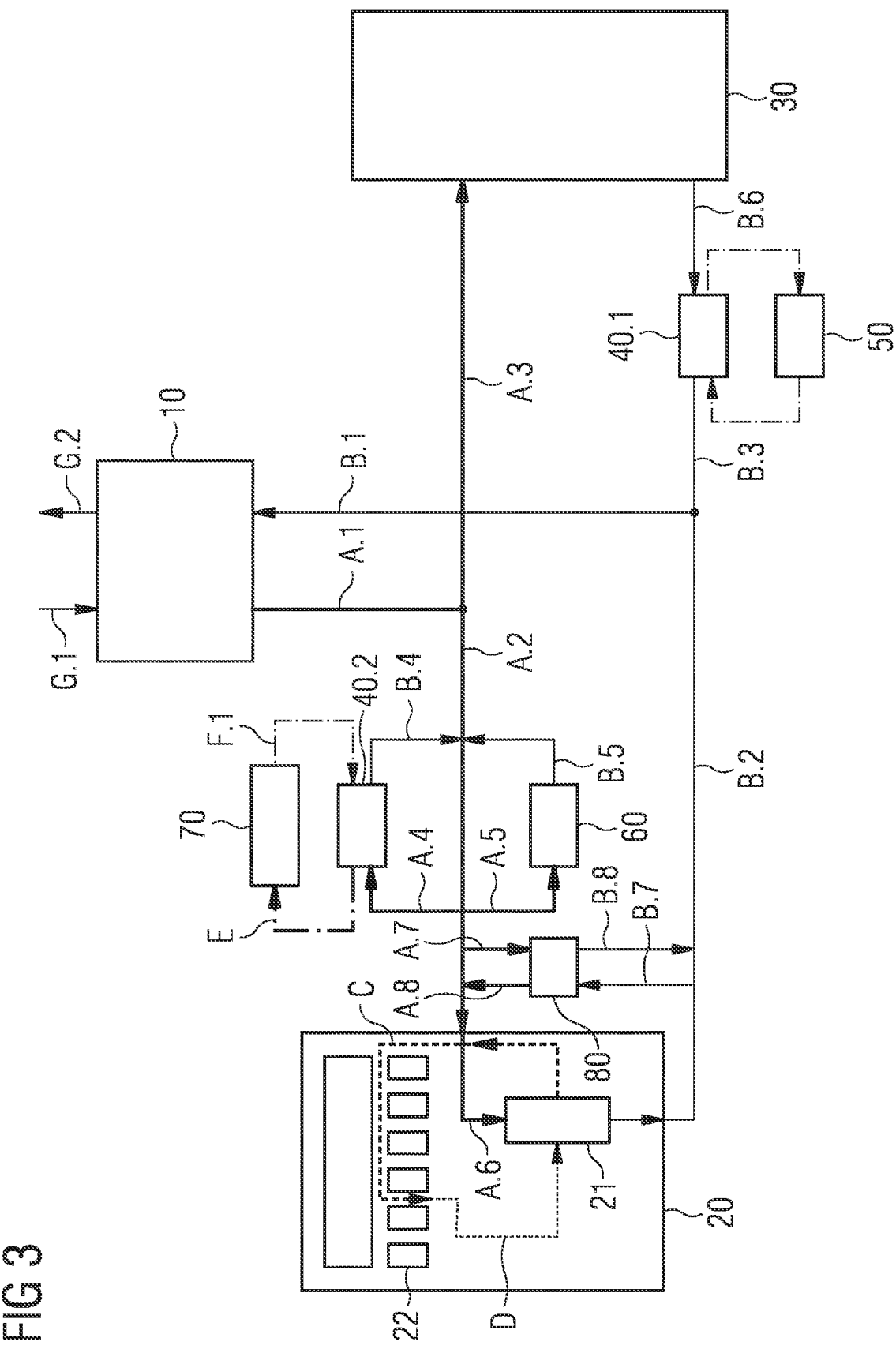
FIG. 3 shows a diagram showing a liquid coolant system with multiple components of the wind turbine of FIG. 1 according to a second embodiment of the invention.

Same objects in FIGS. 1 to 3 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

FIG. 1 shows a wind turbine 1 according to an exemplary embodiment of the invention. The wind turbine 1 comprises a rotor 4 having three wind turbine blades 9.1, 9.2, 9.3 connected to a hub 5. However, the number of wind turbine blades 9 may be at least one wind turbine blade 9, two wind turbine blades 9 or more than three wind turbine blades 9 and chosen as required for a certain setup of the wind turbine 1. The hub 5 is connected to a generator 20 (see FIG. 2) arranged inside a nacelle 6. During operation of the wind turbine 1, the blades 9 are driven by wind to rotate and the wind's kinetic energy is converted into electrical energy by the generator in the nacelle 6. The nacelle 6 is arranged at the upper end of a tower 7 of the wind turbine 1. Alternatively, the wind turbine 1 may be of a design not comprising the nacelle 6. The tower 7 is erected on a foundation 8 such as a monopile or tripile. The foundation 8 is connected to and/or driven into the ground or seabed.

FIG. 2 shows a diagram showing a liquid coolant system with multiple components 20, 30, 50, 60, 70 of the wind turbine 1 of FIG. 1 according to a first embodiment of the invention.

The liquid coolant system comprises a liquid coolant cycle generally depicted with liquid coolant lines A, B. The liquid coolant lines A, B are directly connected to multiple components 20, 30, 60 by the liquid coolant system to an ambient heat exchanger 10 of the liquid coolant system for cooling of the multiple components 20, 30, 60. The multiple components 20, 30, 60 are a generator 20, a converter 30 and a bearing unit 60. The ambient heat exchanger 10 is arranged to exchange heat between a liquid coolant contained in the liquid coolant cycle A, B and an ambient air flow G outside of the nacelle 6 of the wind turbine 1. For this purpose, the ambient air inflow G.1 enters the ambient heat exchanger 10 at ambient temperature and leaves the ambient heat exchanger 10 at a higher temperature. The ambient heat exchanger 10, the hot liquid coolant return line B.1 entering the heat exchanger 10 is cooled through the ambient air inflow G.1 being at a respectively lower temperature, namely ambient temperature. The hot liquid coolant in the hot liquid coolant line B.1 after exchanging heat with the ambient air inflow G.1 leaves the heat exchanger 10 as cold liquid coolant in cold liquid coolant feed line A.1 and the ambient air leaves the heat exchanger 10 as heated ambient air outflow G.2. Note, that the terms hot and cold used herein explain the relative temperatures of the liquid coolant cycle A, B with respect to each other only exemplary such that they indicate a higher and relatively lower temperature but are not limited to any specific temperature.

A heat pump 80 is arranged in between the cold liquid coolant feed line A.1 and the hot liquid coolant return line B.1. The heat pump 80 is arranged in parallel to the ambient heat exchanger 10. When the heat pump 80 is operated in the cooling operation mode, the liquid coolant inside of the cold liquid coolant feed line A.1 may be cooled even further, in particular below the ambient temperature of the ambient air G. The cooling operation mode is controlled by a control unit 81 of the heat pump 80.

The generator 20 and the converter 30 are connected in parallel with each other by the liquid coolant cycle A, B. A cold liquid coolant line A.2 and a cold liquid coolant line A.3 are connecting the heat pump 80 with the generator 20 and the converter 30, respectively. A valve, not being shown, may be connected in between the generator 20 and the converter 30 for controlling the flow of the coolant liquid to either of these. Further, generally, any number of pumps may be arranged at any location in the liquid coolant cycle to stream the liquid coolant to any of the components 20, 30, 50, 60, 70. However, for the purpose of clarity, these valves and pumps are not shown in FIGS. 2 and 3 but will be integrated by a person skilled in the art accordingly.

Inside of the generator 20 or its housing, the cold liquid coolant line A.6 flows through an internal cooling unit 21 exchanging heat with an air flow C, D inside of the generator 20 or its housing. The air inflow D is a cold air flow being cooled by the internal cooling unit 21, through which the cold liquid coolant flows, and flowing through or in between stator windings 22 of the generator 20, thereby cooling them and being heated to a hot air outflow D being returned to the internal cooling unit 21 and heating up the cold liquid coolant. Thereby, the cold liquid coolant leaves the internal cooling unit 21 as a hot liquid coolant being returned by hot liquid coolant line B.2 to the heat pump 80.

The converter 30 is being cooled by the cold liquid coolant in the cold liquid coolant line A.3. Hot liquid coolant in the hot liquid coolant line B.6 leaves the converter 30. Because the converter 30 typically does not get as hot as the generator 20, the hot liquid coolant in the hot liquid coolant line B.6 is not as hot as the hot liquid coolant line B.2, being supplied through hot liquid coolant line B.3 towards the converter 30. Thereby, the temperature difference between the hot liquid coolant line B.6 and the hot liquid coolant line B.3 is used by a first heat exchanger 40.1 to cool a transformer 50 as a further component 50 generating heat during operation of the wind turbine 1 in a separate oil cycle thereof.

A branch cold liquid coolant line A.5 is attached to the cold liquid coolant line A.2 in between the ambient heat exchanger 10 or the heat pump 80 and the generator 20 and connects with a bearing unit 60 as a further component 60 generating heat during operation of the wind turbine 1 to be cooled by means of the cold liquid coolant. A return branch hot liquid coolant line B.5 returns the heated liquid coolant to the cold liquid coolant line A.2.

Further, a branch cold liquid coolant line A.4 is attached to the cold liquid coolant line A.2 in between the heat pump 80 and the generator 20 and connects with a second heat exchanger 40.2. The second heat exchanger 40.2, a hydraulic unit 70 as a further component 70 generating heat during operation of the wind turbine 1 is connected with its oil cycle E, F.1 and the oil inside the oil cycle E is being indirectly cooled. A return branch hot liquid coolant line B.4 returns the heated liquid coolant to the cold liquid coolant line A.2.

FIG. 3 shows a diagram showing a liquid coolant system with multiple components 20, 30, 50, 60, 70 of the wind turbine 1 of FIG. 1 according to a second embodiment of the invention.

In this second embodiment of the invention, the heat pump 80 is being arranged in between the generator 20 and the rest of the components 30, 50, 60, 70 instead of in between the ambient heat exchanger 10 and the multiple components 20, 30, 50, 60, 70 as in the first embodiment of the invention. Thereby, the generator 20 is directly supplied with the liquid coolant cooled by the heat pump 80. The bearing unit 60 and the second heat exchanger 40.2 are not supplied with the liquid coolant cooled by the heat pump 80. Thereby, the generator 20 may be specifically and primarily cooled by the heat pump 80.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind turbine comprising:
   a plurality of components generating heat during operation of the wind turbine; and
   a liquid cooling system, wherein the plurality of components are thermally coupled by a liquid coolant cycle of the liquid cooling system to an ambient heat exchanger of the liquid cooling system, the ambient heat exchanger being arranged to exchange heat between a liquid coolant contained in the liquid coolant cycle and ambient air;
   wherein the liquid cooling system comprises a heat pump having a cooling operation mode, the heat pump being arranged in the liquid coolant cycle such that the liquid coolant of the liquid coolant cycle is cooled when the heat pump is operated in the cooling operation mode;
   wherein the heat pump is integrated within the liquid coolant cycle in between the plurality of components generating heat during operation of the wind turbine and the ambient heat exchanger to cool the liquid coolant below an ambient air temperature; and
   wherein the ambient heat exchanger and the heat pump are arranged such that: (i) an ambient air inflow from an ambient environment at an ambient temperature enters and passes through the ambient heat exchanger and then passes through the heat pump and (ii) an air outflow enters and passes through the heat pump and then passes through the ambient heat exchanger into the ambient environment at a temperature that exceeds the ambient temperature.

2. The wind turbine according to claim 1, wherein the heat pump is connected in parallel to the ambient heat exchanger.

3. The wind turbine according to claim 1, wherein the heat pump has a refrigerant cycle separate from the liquid coolant cycle.

4. The wind turbine according to claim 1, wherein the heat pump is arranged in between two of the plurality of components generating heat during operation of the wind turbine.

5. The wind turbine according to claim 4, wherein one of the two of the plurality of components, in between which the heat pump is arranged, is a generator of the wind turbine.

6. The wind turbine according to claim 1, wherein one of the plurality of components generating heat during operation of the wind turbine is a generator.

7. The wind turbine according to claim 6, wherein the generator comprises an internal cooling unit, wherein the internal cooling unit is arranged to cool the air flowing through the generator or a housing of the generator with the liquid coolant of the liquid coolant cycle.

8. The wind turbine according to claim 6, wherein one of the plurality of components generating heat during operation of the wind turbine is a converter.

9. The wind turbine according to claim 8, wherein the generator and the converter are connected in parallel with each other by the liquid coolant cycle.

10. The wind turbine according to claim 1, wherein at least one of the plurality of components is a bearing unit, a transformer and/or a hydraulic unit.

11. The wind turbine according to claim 1, wherein the heat pump comprises a condenser, a compressor, an evaporator, and an expansion valve.

12. The wind turbine according to claim 1, wherein the liquid cooling system comprises a control unit, the control unit being arranged to operate the heat pump in the cooling operation mode such that a temperature of the liquid coolant cooled by the heat pump is lower than an ambient temperature of ambient air.

13. The wind turbine according to claim 12, wherein the control unit is arranged to operate the heat pump in the cooling operation mode upon receiving a request for operating or upon operating the wind turbine at a load requiring cooling of the liquid coolant below ambient temperature of the ambient air.

14. A method for operating the wind turbine according to claim 1, of the method comprising:
- cooling the liquid coolant using the ambient heat exchanger;
- requesting operation of or operating the wind turbine at a load requiring cooling of the liquid coolant below an ambient temperature of ambient air; and
- operating the heat pump in the cooling operation mode such that a temperature of the liquid coolant cooled by the heat pump is lower than the ambient temperature of the ambient air.

* * * * *